(12) United States Patent
Mazula

(10) Patent No.: US 10,360,438 B2
(45) Date of Patent: Jul. 23, 2019

(54) 3D TO 2D REIMAGING FOR SEARCH

(71) Applicant: Dassault Systemes, Velizy Villacoublay (FR)

(72) Inventor: Nelia Gloria Mazula, Houston, TX (US)

(73) Assignee: Dassault Systemes, Velizy Villacoublay (FR)

( * ) Notice: Subject to any disclaimer, the term of this patent is extended or adjusted under 35 U.S.C. 154(b) by 0 days.

(21) Appl. No.: 14/984,412

(22) Filed: Dec. 30, 2015

(65) Prior Publication Data

US 2017/0193278 A1 Jul. 6, 2017

(51) Int. Cl.
G06K 9/00 (2006.01)
G06F 16/50 (2019.01)
G06F 16/583 (2019.01)

(52) U.S. Cl.
CPC ......... *G06K 9/00208* (2013.01); *G06F 16/50* (2019.01); *G06F 16/583* (2019.01); *G06K 9/00664* (2013.01)

(58) Field of Classification Search
CPC . G06T 3/0031; G06K 9/00208; G06K 9/4609
See application file for complete search history.

(56) References Cited

U.S. PATENT DOCUMENTS 6,973,453 B2 * 12/2005 Culp .................. G06F 16/5838
10,049,479 B2 * 8/2018 Mazula .................. G06T 11/60
10,127,333 B2 11/2018 Mazula
2004/0249809 A1 12/2004 Ramani et al.
2006/0067573 A1 * 3/2006 Parr .................. G06K 9/00201
382/154
2009/0222446 A1 9/2009 Goldschmidt et al.
2010/0046704 A1 * 2/2010 Song ...................... G01N 23/04
378/57
2011/0015901 A1 * 1/2011 Winterberg ............ G01B 21/20
703/1

(Continued)

FOREIGN PATENT DOCUMENTS

EP 2892028 A2 7/2015
EP 2892028 A3 11/2015

(Continued)

OTHER PUBLICATIONS

"Point Cloud," Wikipedia, May 19, 2015, Retrieved from https://en.wikipedia.org/wiki/Point_cloud on Apr. 6, 2016.

(Continued)

*Primary Examiner* — Shaghayegh Azima
(74) *Attorney, Agent, or Firm* — Hamilton, Brook, Smith & Reynolds, P.C.

(57) ABSTRACT

An embodiment provides a method of identifying an object from three-dimensional data of the object. Such an embodiment obtains 3D data of an object and, in turn, flattens the 3D data to produce 2D data of the object. The produced 2D data of the object is then compared to a library of existing 2D data to identify matching 2D object data. The matching 2D object data corresponds to an object and as a result of the comparing, the object represented by the obtained 3D data is identified as being of kind as the matching 2D object. This can be performed iteratively and bi-directionally to identify unidentified objects contained in a 3D environment.

17 Claims, 5 Drawing Sheets

(56) References Cited

U.S. PATENT DOCUMENTS

| | | | |
|---|---|---|---|
| 2011/0064282 A1* | 3/2011 | Abramovich | G06K 9/00033 382/124 |
| 2011/0129124 A1* | 6/2011 | Givon | G06F 3/011 382/107 |
| 2012/0170821 A1* | 7/2012 | Zug | A61F 2/46 382/128 |
| 2013/0185024 A1 | 7/2013 | Mahasenan et al. | |
| 2014/0192050 A1* | 7/2014 | Qiu | G06T 17/10 345/420 |
| 2014/0210856 A1 | 7/2014 | Finn et al. | |
| 2014/0350395 A1* | 11/2014 | Shachaf | G06T 7/0012 600/431 |
| 2015/0002639 A1* | 1/2015 | Kwon | H04N 13/254 348/47 |
| 2015/0197016 A1* | 7/2015 | Krenik | B26B 19/3806 83/13 |
| 2015/0213059 A1* | 7/2015 | Ely | G06F 16/5838 382/103 |
| 2015/0254499 A1* | 9/2015 | Pang | G06K 9/00208 382/103 |
| 2015/0279087 A1 | 10/2015 | Myers et al. | |
| 2015/0294511 A1* | 10/2015 | Nishioka | G06T 15/06 345/420 |
| 2016/0047903 A1* | 2/2016 | Dussan | G01S 7/484 356/5.01 |
| 2017/0007368 A1* | 1/2017 | Boronkay | A61C 7/002 |
| 2017/0100088 A1* | 4/2017 | Simon | G06T 11/006 |
| 2017/0168812 A1* | 6/2017 | Golay | G06F 8/654 |
| 2017/0193132 A1 | 7/2017 | Mazula | |
| 2017/0193696 A1 | 7/2017 | Mazula | |

FOREIGN PATENT DOCUMENTS

| WO | WO 2006/097926 A2 | 9/2006 |
|---|---|---|
| WO | WO 2010/009840 A1 | 1/2010 |

OTHER PUBLICATIONS

Extended European Search Report for European Application No. 16207196.3 dated Jun. 8, 2017 entitled "Density Based Graphical Mapping".
Kris Demarsin, "Extraction of Closed Feature Lines from Point Clouds Based on Graph Theory", Retrieved from the Internet: URL:http://www.cs.kuleuven.be/publicaties/doctoraten/tw/TW2009_01.pdf, p. 1-136, Jan. 1, 2009.
Son, H. et al., "Knowledge-Based Approach for 3D Reconstruction of As-Built Industrial Plant Models From Laser-Scan Data", 2013 Proceedings of the 30$^{th}$ International Symposium on Automation and Robotics in Construction, pp. 1-9, Aug. 11, 2013.
Autodesk, "Cloud Services," http://www.autodesk.com/360-cloud, 2014; retrieved on Aug. 16, 2017.
Kim, et al., "Automated Construction Progress Measurement Using a 4D Building Information Model and 3D Data," Dept. of Architectural Eng., Republic of Korea, Dec. 2012.
Non-Final Office Action for U.S. Appl. No. 14/983,878, "Density Based Graphical Mapping," dated Aug. 23, 2017.
Gao, Te, "Constructing a Complete and Accurate As-Build BIM Based on an As-Designed BIM and Progressive Laser Scans," Carnegie Mellon University, Dissertations. Paper 363. 2014.
Blümel, Ina, et al., PROBADO3D—Indexing and Searching 3D CAD Databases: Supporting Planning through Content-Based Indexing and 3D Shape Retrieval, International Conference on Design & Decision Support Systems in Architecture and Urban Planning, pp. 1-7 (Jul. 22, 2010).
Extended European Search Report for European Application No. 16207197.1 dated May 10, 2017.
Extended European Search Report for European Application No. 16207198.9 dated May 11, 2017.
Funkhouser, Thomas, et al., "A Search Engine for 3D Models", ACM Transactions on Graphics, 22(1): 83-105 (Jan. 1, 2003).
Tangelder, Johan W. H. and Veltkamp, Remco C.,"A survey of content based 3D shape retrieval methods", Multimedia Tools and Applications, Kluwer Academic Publishers, 39(3): 441-471 (Dec. 8, 2007).
Final Office Action for U.S. Appl. No. 14/983,878, "Density Based Graphical Mapping" dated Feb. 28, 2018, 49 pages.
Notice of Allowance for U.S. Appl. No. 14/983,878, "Density Based Graphical Mapping," dated Jun. 21, 2018.
EP Communication pursuant to Article 94(3) EPC, 16207197.1, entitled,"3D to 2D Reimaging for Search," dated Apr. 17, 2019.

* cited by examiner

3D TO 2D REIMAGING FOR SEARCH

RELATED APPLICATIONS

This application is related to "DENSITY BASED GRAPHICAL MAPPING" by Nelia Gloria Mazula, Ser. No. 14/983,878 and "EMBEDDED FREQUENCY BASED SEAERCH AND 3D GRAPHICAL DATA PROCESSING" by Nelia Gloria Mazula, Ser. No. 14/984,765. The entire teachings of the above applications are incorporated herein by reference.

BACKGROUND

Embodiments generally relate to the field of computer programs and systems, and specifically to the field of computer aided design (CAD), computer-aided engineering, and modeling.

A number of systems and programs are offered on the market for the design of parts or assemblies of parts. These so called CAD systems allow a user to construct and manipulate complex three-dimensional models of object or assemblies of objects. CAD systems thus provide a representation of modeled objects using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to the designers; these tools are dedicated to the display of complex objects. For example, an assembly may contain thousands of parts. A CAD system can be used to manage models of objects, which are stored in electronic files.

SUMMARY OF THE INVENTION

There is a vast amount of model, e.g. CAD model, data in existence. However, in order to reap the efficiency benefits of reusing existing data, efficient methods for identifying and searching such data are need. Embodiments of the present invention provide methods and systems for identifying an object from three-dimensional (3D) data of the object. Embodiments of the invention can be used in a variety of applications, for example, facility and object re-design and maintenance.

An embodiment of the present invention begins by obtaining, in computer memory, 3D data of a given object. In turn, this 3D data is flattened by a processor connected to the memory to produce two-dimensional (2D) data of the given object. The produced 2D data of the given object is then compared to a library of existing 2D object data to identify matching 2D object data. In such an embodiment, the 2D object data corresponds to a respective certain real-world object. As a result of the comparing, the given object is identified as being of kind to the certain real-world object. In an embodiment of the method, in response to identifying matching 2D object data, the obtained 3D data is updated using the matching 2D object data. According to an embodiment, said updating may include updating an object type and/or object material.

Embodiments of the present invention may utilize a library including any type of 2D object data known in the art. In an embodiment, the 2D object data is at least one of a photograph, a video, and a 2D CAD object. Similarly, embodiments may obtain any type of 3D data that is known in the art, including 3D CAD model data and point cloud data. According to an embodiment, the produced 2D data of the given object represents a face of the given object. An alternative embodiment of the method further comprises creating the library of 2D object data by flattening known 3D data. Further still, in yet another embodiment, the obtaining, flattening, comparing, and identifying are iterated for a plurality of objects in an environment and the comparing considers the plurality of objects in the environment.

Another embodiment of the present invention is directed to a computer system for identifying an object from 3D data. Such a computer system comprises a processor and memory with computer code instructions stored thereon where the processor and the memory, with the computer code instructions, are configured to cause the system implement the various embodiments described herein. In one such embodiment, the processor and the memory, with the computer code instructions, are configured to cause the system to obtain 3D data of a given object in the memory and, in turn, flatten the 3D data of the given object to produce 2D data of the given object. Further, in such an embodiment, the processor and the memory, with the computer code instructions, further cause the system to compare the produced 2D data of the given object to a library of existing 2D object data to identify matching 2D object data where the matching 2D object data corresponds to a respective certain real-world object. According to a computer system embodiment, the library is held in the computer system memory. Further, in an embodiment, as a result of the comparing, the computer system identifies the given object, i.e. object for which 3D data was obtained, to be of kind to the certain real world object.

In an alternative computer system embodiment, the processor and the memory, with the computer code instructions, are further configured to cause the system to update the obtained 3D data of the given object using the matching 2D object data. In an embodiment, the matching 2D object data includes at least one of an object type and an object material. Further, according to an embodiment, the 2D object data is at least one of a photograph, a video, and a 2D CAD object. Further still, in an example computer system embodiment, the 3D data of the given object is at least one of a 3D CAD model and a point cloud. Moreover, according to yet another embodiment, the produced 2D data of the given object represents a face of the given object.

In yet another example embodiment, the processor and the memory, with the computer code instructions, are further configured to cause the system to create the library of 2D object data by flattening known 3D data. A further embodiment of the computer system is configured to iterate the obtaining, flattening, comparing, and identifying for a plurality of objects in an environment and in such an embodiment the comparison considers the plurality of objects in the environment.

Another embodiment of the present invention is directed to a cloud computing implementation for identifying an object from 3D data of the object. Such an embodiment is directed to a computer program product executed by a server in communication across a network with one or more clients, where the computer program product comprises a computer readable medium. In such an embodiment, the computer readable medium comprises program instructions which, when executed by a processor, causes the processor to obtain, in computer memory, 3D data of a given object and flatten the 3D data of the given object to produce 2D data of the given object. Further, in such an embodiment, the program instructions, when executed by the processor, further cause the processor to compare the produced 2D data of the given object to a library of existing 2D object data to identify matching 2D object data and, as a result of the comparing, identify the given object to be of kind to the certain real-world object.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
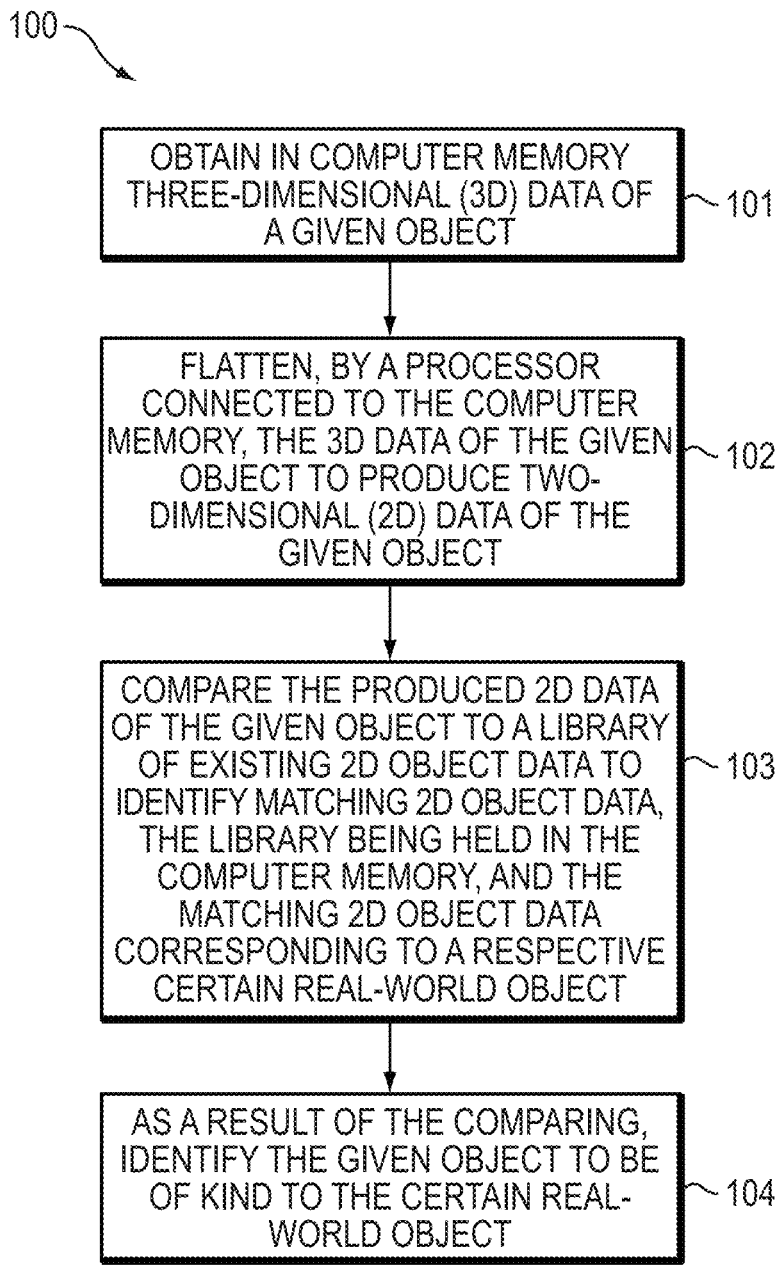
FIG. 1 is a flowchart of a method for identifying an object according to an example embodiment.

A description of example embodiments of the invention follows.

The teachings of all patents, published applications and references cited herein are incorporated by reference in their entirety.

As noted herein, embodiments of the present invention provide methods of searching for and identifying objects from 3D data of the objects. Current methodologies search from 3D to 3D or from 2D to 2D. For instance, if an object is in 3D, the object's metadata and/or dimensional information are used to map and search for other similar objects. Thus, if one is looking for a pump object (e.g., in 3D CAD), the object characteristics are used to find matching items. This is also done in the 2D world. One example is face recognition, where unique facial ratios are used to match a picture of an "unknown" person to an existing picture where the person has been previously identified. However, such methods do not facilitate identifying/searching 3D data using a library of 2D information. For instance, if one is searching for a 3D CAD image of a pump in a database of 2D images, one cannot match the 3D characteristics of the pump to the existing 2D characteristics. This ability, i.e. identifying 3D data of an object using 2D data, would be very useful. For example, such a method could be used in recreating CAD models of complex and unknown environments using unintelligent image information like laser scan, video, picture, or even sonar, amongst other examples, as described in "DENSITY BASED GRAPHICAL MAPPING" by Nelia Gloria Mazula, Ser. No. 14/983,878, the contents of which are herein incorporated by reference.

Current technology does not offer a methodology to rapidly search from 3D to 2D leveraging a comprehensive 2D to 2D search as well as the 3D to 3D search characteristics to identify objects in existing databases. More specifically, current technology, at best, is limited to 2D to 2D comparison/search using distance ratios and other similar characteristics to map objects, e.g., facial recognition. There is no search/identification technology that can perform a characteristic evaluation on 3D data of an object to search amongst existing 2D object data and vice-versa.

Current technologies are also limited by file formats because, generally, file formats are not readable by all search engines. For example, if one wants to identify a 3D object by searching 2D data and the 3D object is created in a CATIA format, the search engine, i.e., a search engine that facilitates searching a library of 2D data, is likely unable open the 3D data file so that it can be processed and used in searching the 2D data library. For instance, the 2D search engine would need to automatically capture a snapshot of the 3D object, i.e., take a view of the 3D object, and a run a search. This type of methodology is currently not available. Such functionality could be used in a variety of scenarios. For instance, such a search could be used with laser scans, sonar scans, or even video images (particularly 3D) of large complex environments such as chemical plants that need re-engineering, e.g., updates to the CAD model of the plant. Laser scans, for example, are not intelligent, i.e. laser scan data of a pump has no information actually identifying the data as corresponding to a pump. With such data, a 3D-2D-3D search protocol would be valuable in building intelligence into the environment, such as identifying all pumps, all pump types, and specific pumps.

Current solutions for identifying an object from 3D data of the object are not scalable to large amounts of data, e.g., the data generated in re-imaging a complex environment. Examples of such large scale data sets are laser scanned chemical plants or subsea facilities. In these examples, it is common to have "as-built" drawings that do not reflect the actual "as-is" environment. In these scenarios, a laser scan, video, or sonar can be done of the unknown environment and using embodiments of the invention, for example, these unintelligent data types can be enhanced. A laser scan is not intrinsically intelligent, it does not have any identifying metadata, it is just an image (e.g., laser scan data of a pump does not know it is a pump). There are only limited existing methods to attach intelligence/characteristics/meta information to the laser scan data of objects. Typically, people attribute the characteristics manually or using 3D to 3D mapping. While 3D to 3D mapping does help to attribute metadata to unintelligent information, there is no existing method to utilize data of 2D images, i.e., pictures or diagrams, to further improve the characteristic information of the 3D data. Because the environment data, i.e., sonar scan data, does not have any intelligence, it does not provide any other meta information that can be used to characterize the 3D data. For instance, the laser scan data does not have information on the material that was scanned that can be used to identify the object. In an embodiment, principles of the present invention can be leveraged to flatten 3D data to produce 2D data to enable 2D to 2D characteristic searching. In turn, any identified data found with the 2D to 2D comparison can be used to update the metadata of the 3D data.

FIG. 1 is a flow diagram of a method 100 for identifying an object from 3D data of the object. The method 100 begins by obtaining 3D data of a given object in computer memory at step 101. The 3D data may be any such 3D data known in the art, for instance, a finite element model, a 3D CAD model, a point cloud, laser scan data, and sonar data, amongst other examples.

Further, the data may be obtained through any means known in the art, for example, via a wide area network (WAN) or local area network (LAN). In an embodiment, the method 100 is implemented by a computing device and in such an embodiment, the 3D data of the object is obtained at step 101 from any point communicatively coupled to the computing device. Further, in an embodiment, the data of the object is obtained from a plurality of points.

After obtaining the data at step 101, the method 100 continues and the 3D data is flattened to produce 2D data of the given object at step 102. In an embodiment, the 3D data is flattened at step 102 by taking a snap shot of a view of the 3D data. For instance, in such an embodiment, the produced 2D data represents a face of the object. According to an embodiment of the method 100, only a portion of the 3D data is flattened, for example, only two views of the 3D data may be used to produce the 2D data at step 102. In yet another embodiment, all of the 3D data or one or more portions of the 3D data may be flattened. According to an embodiment, the 3D data is flattened at step 102 using points extracted from the 3D data. The data can be flattened using a snapshot or vector tracing methodology. The resulting 2D "flat" view of the object/data can be compared to other 2D images or graphic files as described herein.

The method 100 continues at step 103 by comparing the produced 2D data to a library of existing 2D object data to identify matching 2D object data. In such an embodiment, the matching 2D object data corresponds to a respective object. In an embodiment, the object may be any object known in the art, such as a real-world object. For example, the 3D data can be from a laser scan of an oil processing plant, and single portion of the data representing a pump can be extracted and flattened or converted into a 2D view as described herein. The extracted pump data can be compared to other 2D data at step 103 to identify basic information including that the object is a pump or it can be used to identify more comprehensive metadata including the pump type, dimensions, and material(s). It should be noted that embodiments of the invention are not limited and the object may not be a real-world object. For instance, an embodiment of the method 100 may be used to identify 3D data from a video game and in such an embodiment the 2D in the library may correspond to an object from the video game. According to an embodiment, the 2D object data of the library may be any 2D object data known in the art. For example, the 2D data may include photographs, videos, and/or 2D CAD objects, amongst other examples. The comparison performed at step 103 may consider any parameters of the 2D data in identifying matching 2D object data. For instance, the comparison may compare dimensions of the 2D data to identify any objects in the library with the same or similar dimensions and/or characteristics.

According to an embodiment of the method 100, the library of existing 2D object data is stored on a computing device implementing the method 100. However, embodiments of the present invention are not so limited and in an embodiment the library may be stored at any point communicatively coupled to the computing device implementing the method 100. Further still, in an embodiment, the library is distributed over a plurality of storage devices and the plurality of devices is used in performing the comparing at step 103. One example embodiment of the method 100 further comprises creating the library of 2D object data. In such an embodiment, the library is created by flattening 3D data of known objects. For example, if there is a 3D CAD model with populated metadata identifying, for instance, the type of object the 3D CAD model represents, an embodiment of the method 100 may flatten this data and populate the library of 2D data with the flattened data.

To continue, as a result of the comparing at step 103, the method 100 at step 104 identifies the given object to be of kind to the certain real-world object. Thus, the method 100 starts with unidentified or partially identified 3D data of a given object at step 101, processes the data to produce 2D data of the given object at step 102 and compares the produced 2D data to a library of existing 2D data at step 103 to ultimately identify the given object at step 104. In an embodiment, the method 100 updates the obtained 3D data using the matching 2D data. For example, if the matching 2D data indicates an object type and an object material, the 3D data obtained at step 101 is updated with such attributes.

Embodiments of the method 100 can implement a complex bi-directional 2D-to-3D-to-2D mapping algorithm to identify objects of an environment. Consider, for example, an embodiment where the 3D data is 3D data representing an oil processing environment and the data includes a characteristic inlet flange for a specific kind of centrifugal pump. In such an embodiment, a "flattened" view of the pump can be generated and used to identity this flange. Those metadata characteristics, i.e., object type, can be assigned to this 2D flattened data and subsequently assigned to the object in the original 3D environment. The algorithm can be iterated to further identify objects in the environment using the flange information, for example, to identify the parent grouping, in this case the special centrifugal pump to which the pump belongs. The reverse of the 2D-to-3D-to-2D can be done to select, isolate, and identify the remaining objects in the 3D data that should be attributed to the pump. This bidirectional and iterative process can be executed for all of the 3D data, e.g., an entire point cloud, until all or most of the objects in the 3D data are characterized using known information.

Example characteristics like texture and color can also be used to aid in the comparing performed in embodiments of the method 100. In an embodiment of the method 100, the material or color of the flattened data can be identified by analyzing the data. For instance, it can be inferred that an object is made of a carbonized steel material by detecting bumps in the data. Similarly, the data can be analyzed to determine a color of the object. This information, e.g., color and material, can be used to aid in the mapping of the object.

Another embodiment of the method 100 iterates the obtaining, flattening, comparing, and identifying for a plurality of objects in the environment. Further, in an embodiment, the data for an entire environment may be obtained at once and processed to identify for example, portions of the data pertaining to particular objects. This data may then be processed according to steps 102-104 as described herein. Further still, in an embodiment where there are a plurality of objects, the comparing at step 103 may consider the plurality of objects. In other words, the comparing for a given object may be informed by the plurality of other objects in the data that have been identified. In an example, the obtained 3D data contains two objects, and the first object is identified as a valve. In turn, because an embodiment may be programmed to apply appropriate logical rules, it may be known that valves typically lead to pipes. Thus, the comparing at step 103 may first compare the obtained data to existing pipe data in the library.

To further illustrate the method 100, an example in the context of a chemical processing plant is described herein below. In such an example, a chemical processing plant is laser scanned producing a point cloud of an object (the object is a pump but, because the laser scan point cloud is unintelligent data, there is no associated metadata to identify the point cloud as such). This laser scanned data is obtained at step 101 and in turn, flattened at step 102 to produce 2D data of the pump (which at this point is unidentified). At step 103 the flattened data is compared to a library of 2D data and in this comparison, 2D data matching the flattened data is found at step 103. Further, the identified matching 2D data has associated metadata that for example indicates that the object is a pump, made by ACME, and composed of brass. In turn, at step 104, the object represented by the originally obtained 3D data is now identified as a pump, made by ACME, and composed of brass.

Figure 2:
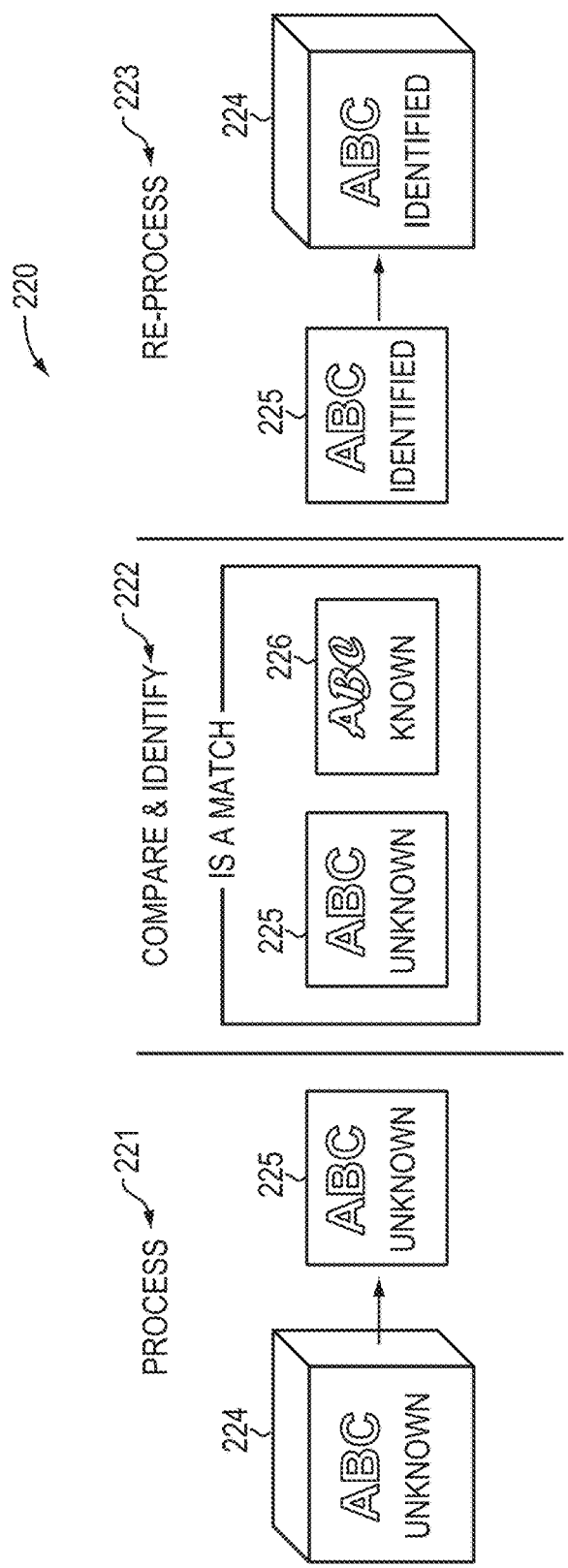
FIG. 2 depicts a process flow of comparing data that may be used in embodiments.

FIG. 2 depicts a method 220 of identifying an object from 3D data of an object using principles of the present invention. The method 220 begins with the flattening process 221 where the unidentified 3D data 224 is flattened to produce the 2D data 225. The flattening process 221 may be performed by taking a snapshot of a single view of the 3D data 224 and/or by removing data from the 3D data 224 such that the remaining data only pertains to a 2D portion of the original 3D data 224. Flattening can also be done by vector tracing the 3D data and converting the vector files into 2D views. A comparison and identification process 222 continues the method 220. In the comparison and identification process 222, the unidentified 2D data 225 is compared to known 2D data to find the matching 2D data 226. The comparison process 222 may utilize a library and/or plurality of libraries of 2D or photo image data. Further, in an embodiment, the unknown 2D data and library of 2D data are compared using common equidistance points. In such an embodiment, matching data, such as the 2D data 226 is identified where the unknown data 225 and matching data 226 have similar or the same equidistance points. When the comparison and identifying process 222 identifies the matching 2D data 226, the unknown 2D data 225 is now identified. The now identified 2D data 225 can then be used in the re-process step 223 to update the 3D data 224 that was previously unidentified.

Figure 3:
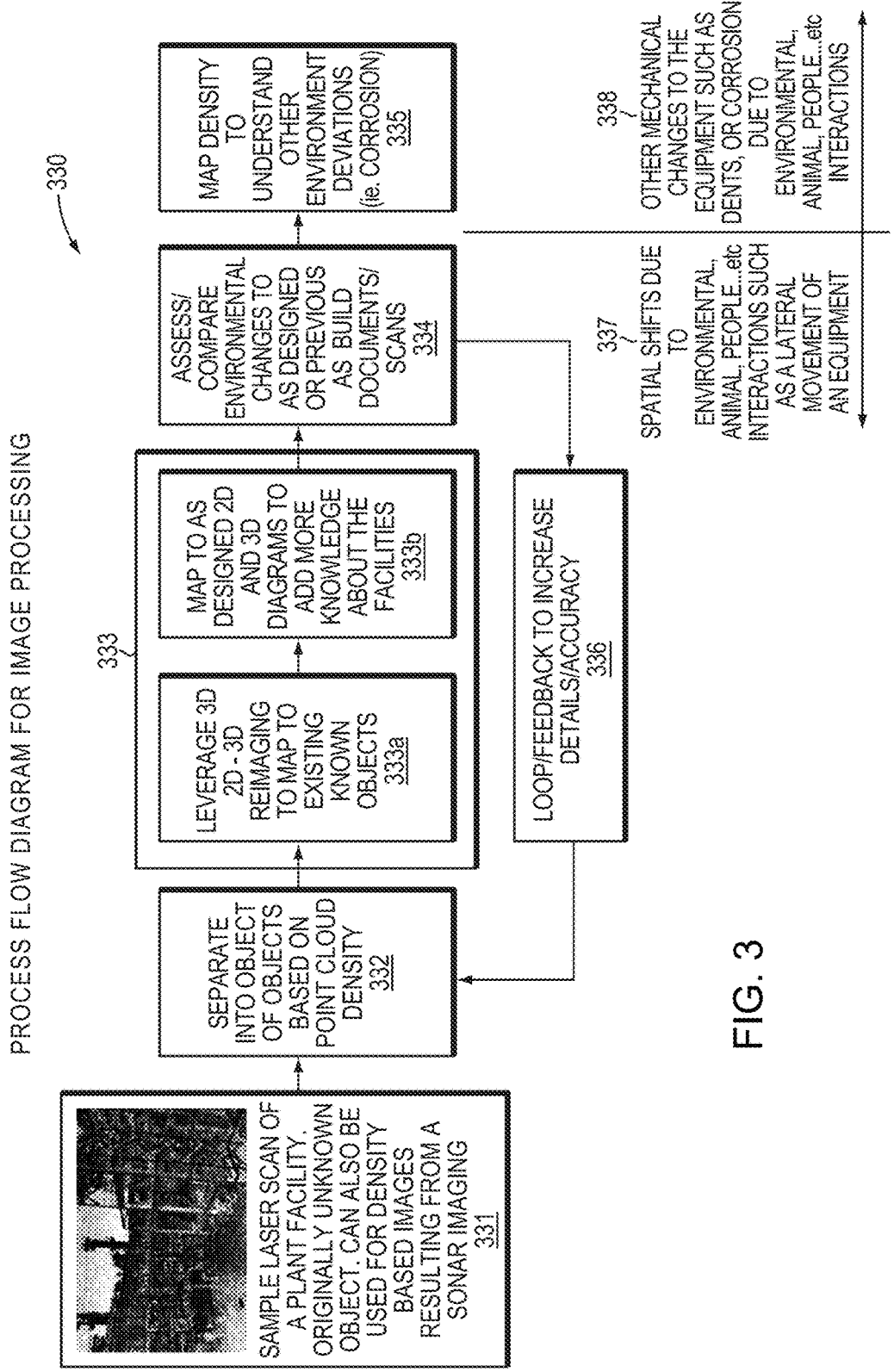
FIG. 3 is a process flow diagram of a method of updating a model using principles of embodiments of the invention.

FIG. 3 depicts a method 330 that can utilize principles of the present invention to attribute intelligence to a laser scan of an object, for example, a chemical processing plant. The method 330 begins at step 331 by laser scanning the object, e.g., an oil processing plant. At step 332 the laser scan data is processed based on point density to identify individual objects and sub-components of those objects. For example, a dense portion of the point cloud surrounded by a relatively low density of points may be considered an object. The point cloud data pertaining to this object can, in turn, be further processed to identify portions of the data with varying densities thereby identifying subcomponents of the object. Next, the identification process 333 is performed according to the principles described herein. In other words, step 333 identifies the point cloud data by flattening the 3D data, comparing the flattened 2D data to known 2D data, and identifying matching 2D data at step 333a. At step 333b the matching data is used to update the point cloud data with more information, e.g., object type, object dimensions, object material, etc. The point cloud data may be updated at step 333b with any information about the object that can be discovered. Thus, when matching 2D data is found at step 333a, any existing matching data about any property of the object can be attributed to the point cloud data of the object at step 333b. Next, in an example of the method 330 where an original 3D model/data for the facility exists, the method 330, at step 334, assesses and compares environmental changes to the as designed/built model. In other words, the now identified 3D data is compared to existing 3D data of the facility to identify distinctions between the existing data and the facility as it currently exists. This process 334 can, for example, identify spatial shifts due to environmental, animal, or people interactions, such as lateral movement of equipment 337. The method 330 can further still, evaluate the density data of the now identified 3D data at step 335 to gain knowledge on other environmental/mechanical changes such as dents and corrosion 338.

The method 330 may further include a feedback process 336 to add further detail to the knowledge of the 3D data. While depicted in FIG. 3 as occurring from step 334, in embodiments, the feedback process 336 may be performed from step 333a, 333b, 334, and/or step 335. The important consideration being that the 3D data has been identified. Once the 3D has been identified, this knowledge can be used to further inform the process. To illustrate, if a particular portion of the point cloud has been identified as belonging to a valve at step 333b. It may then be known from the data library that the valve comprises a valve stem, this information can be used, for example at step 332 to further divide the point cloud data of the valve into two objects, a valve body and a valve stem.

Embodiments of the method 330 enable plant design tools, viewers, laser scan technologies, and other similar image based engineering tools to more expansively attribute intelligence to the plant laser scan, sonar, or similar non-intelligent images using more automated capabilities, which reduces the need for manual interference. In short, embodiments increase the quality of re-engineering of 3D data. Embodiments solve the problem of keeping a model up to date, and thus, improve for example, facilities engineering decisions. Using existing methods, updates are done in a modular way on 2D or 3D solutions without updating the original larger model. Laser scan, for instance, provides a way to collect up to date data on the facility, but the laser scan data is unintelligent data that does not provide a CAD solution to resolve the problem.

Embodiments of the present invention can be used in an iterative matter to identify as much detail as possible about the laser scanned data. Further, embodiments can be configured to identify particular objects of interest. Consider the example where a user wants to identify the manufacturer and location of each pump in a facility. The principles of the present invention can be used to identify the pumps, for example, using the method 330. This will likely leave some of the 3D data unidentified where for example, the component, e.g., pump has been customized or the data is hard to read, i.e., the laser scan did not obtain ideal data for that object. However, the process for identification may also identify objects of the facility that form, for example, pipelines that would feed into a pump. With this knowledge, the 3D data can be re-processed, according to the principles described herein, to identify unknown objects as pumps using for example the pipeline data. Thus, this pipeline knowledge can be used to infer that the hard to read data must be a pump. With this knowledge, the re-processing can update the unknown data to be a pump and further, identify more characteristics of the component using this knowledge.

The foregoing example provides just one instance of advanced logic that can be utilized to identify objects from 3D data utilizing the principles of the present invention. Embodiments of the invention can be configured to use any such logic/decision making to inform the processing. Thus, embodiments can be programmed to use any identifying clues/information to help inform the identification processing implemented by the methods described herein.

Figure 4:
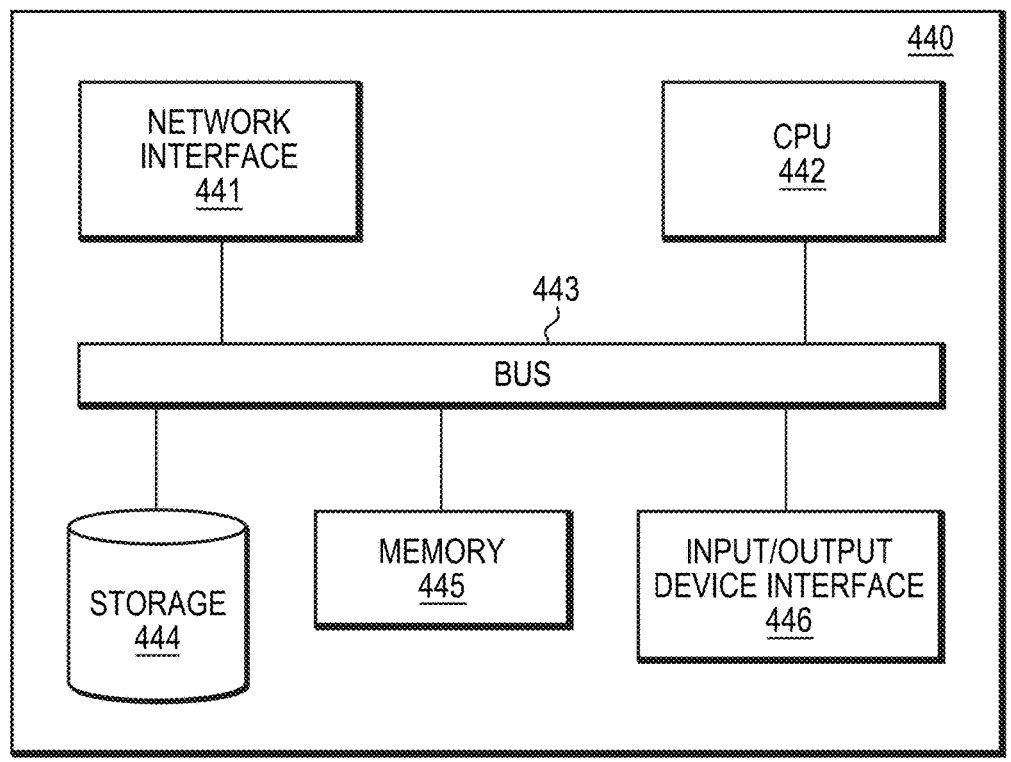
FIG. 4 is a simplified block diagram of a computer system for identifying an object from 3D data of the object according to an embodiment.

FIG. 4 is a simplified block diagram of a computer-based system 440 that may be used to identify an object from 3D data of the object according to an embodiment of the present invention. The system 440 comprises a bus 443. The bus 443 serves as an interconnect between the various components of the system 440. Connected to the bus 443 is an input/output device interface 446 for connecting various input and output devices such as a keyboard, mouse, display, speakers, etc. to the system 440. A central processing unit (CPU) 442 is connected to the bus 443 and provides for the execution of computer instructions. Memory 445 provides volatile storage for data used for carrying out computer instructions. Storage 444 provides non-volatile storage for software instructions, such as an operating system (not shown). The system 440 also comprises a network interface 441 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 440, or a computer network environment such as the computer environment 550, described herein below in relation to FIG. 5. The computer system 440 may be transformed into the machines that execute the methods (e.g. 100 and 330) described herein, for example, by loading software instructions into either memory 445 or non-volatile storage 444 for execution by the CPU 442. One of ordinary skill in the art should further understand that the system 440 and its various components may be configured to carry out any embodiments of the present invention described herein. Further, the system 440 may implement the various embodiments described herein utilizing any combination of hardware, software, and firmware modules operatively coupled, internally, or externally, to the system 440.

Figure 5:
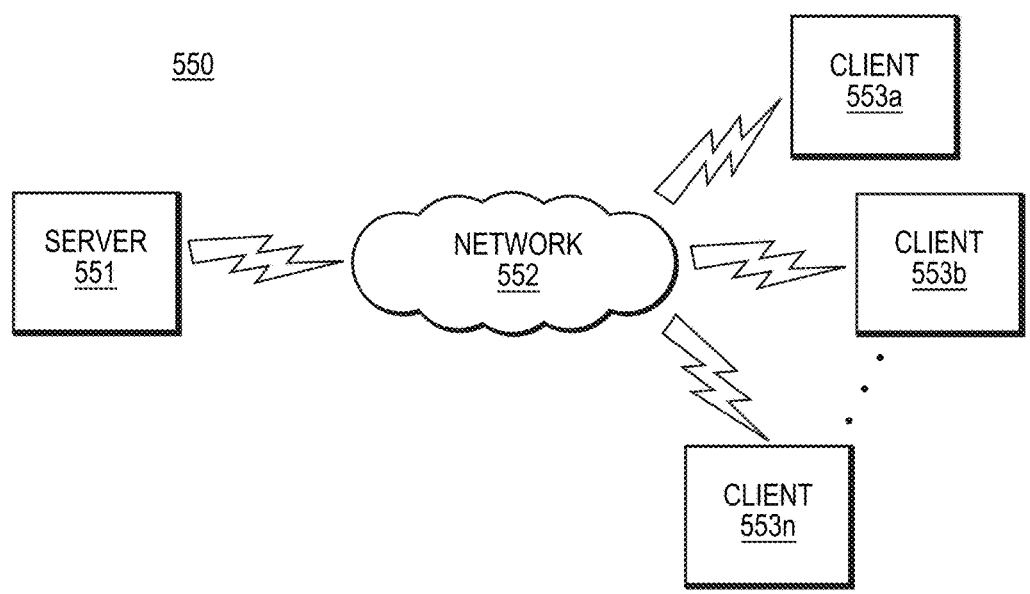
FIG. 5 is a simplified diagram of a computer network environment in which an embodiment of the present invention may be implemented.

FIG. 5 illustrates a computer network environment 550 in which an embodiment of the present invention may be implemented. In the computer network environment 550, the server 551 is linked through the communications network 552 to the clients 553a-n. The environment 550 may be used to allow the clients 553a-n, alone or in combination with the server 551, to execute any of the methods (e.g., 100) described herein.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained here are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method of identifying a real-world object from Three-Dimensional (3D) data of the real-world object in a Computer Aided Design (CAD) system, the computer implemented method comprising:

obtaining in computer memory of the CAD system, 3D data, in a first data storage file format, of a real-world environment comprising a plurality objects;

flattening, by a processor connected to the computer memory, a portion of the 3D data of the real-world environment corresponding to a given object of the plurality of objects to produce Two-Dimensional (2D) data of the given object, the given object being unidentified;

comparing the produced 2D data of the given object to a subset of a library of existing 2D object data to identify matching 2D object data, the library being held in the computer memory of the CAD system and including 2D object data stored in the computer memory in one or more data storage file formats different from the first data storage file format, and the matching 2D object data corresponding to a respective certain real-world object, the subset of the library determined using a given identified object in the real-world environment;

as a result of the comparing, identifying the given object to be of kind to the respective certain real-world object; and responsive to the identifying, updating metadata of the 3D data corresponding to the given object in the computer memory of the CAD system using the matching 2D object data corresponding to the respective certain real-world object.

2. The computer implemented method of claim 1, wherein updating metadata of the 3D data includes updating at least one of:
   an object type; and
   an object material.

3. The computer implemented method of claim 1, wherein the existing 2D object data is at least one of:
   a photograph;
   a video; and
   a 2D Computer Aided Design (CAD) object.

4. The computer implemented method of claim 1, wherein the obtained 3D data of the real-world environment is at least one of:
   a 3D CAD model; and
   a point cloud.

5. The computer implemented method of claim 1, wherein the produced 2D data of the given object represents a face of the given object.

6. The computer implemented method of claim 1, further comprising:

creating the library of 2D object data by flattening known 3D data.

7. The computer implemented method of claim 1, further comprising:
iterating the obtaining, flattening, comparing, identifying, and updating for the plurality of objects in the real-world environment, wherein the comparing considers the plurality of objects in the real-world environment.

8. A Computer Aided Design (CAD) system for identifying a real-world object from Three-Dimensional (3D) data of the real-world object, the CAD system comprising:
a processor; and
a memory with computer code instructions stored thereon, the processor and the memory, with the computer code instructions, being configured to cause the CAD system to:
obtain in the memory of the CAD system, 3D data, in a first data storage file format, of a real-world environment comprising a plurality of objects;
flatten a portion of the 3D data of the real-world environment corresponding to a given object of the plurality of objects to produce Two-Dimensional (2D) data of the given object, the given object being unidentified;
compare the produced 2D data of the given object to a subset of a library of existing 2D object data to identify matching 2D object data, the library being held in the memory of the CAD system and including 2D object data stored in the memory of the CAD system in one or more data storage file formats different from the first data storage file format, and the matching 2D object data corresponding to a respective certain real-world object, the subset of the library determined using a given identified object in the real-world environment;
as a result of the comparing, identify the given object to be of kind to the respective certain real-world object; and
responsive to the identifying, update metadata of the 3D data corresponding to the given object in the memory of the CAD system using the matching 2D object data corresponding to the respective certain real-world object.

9. The CAD system of claim 8, wherein the matching 2D object data includes at least one of:
an object type; and an object material.

10. The CAD system of claim 8, wherein the existing 2D object data is at least one of:
a photograph;
a video; and
a 2D Computer Aided Design (CAD) object.

11. The CAD system of claim 8, wherein the obtained 3D data of the real-world environment is at least one of:
a 3D CAD model; and
a point cloud.

12. The CAD system of claim 8, wherein the produced 2D data of the given object represents a face of the given object.

13. The CAD system of claim 8, wherein the processor and the memory, with the computer code instructions, are further configured to cause the CAD system to:
create the library of 2D object data by flattening known 3D data.

14. The CAD system of claim 8, wherein the processor and the memory, with the computer code instructions, are further configured to cause the CAD system to:
iterate the obtaining, flattening, comparing, identifying, and updating for the plurality of objects in the real-world environment, wherein the comparison considers the plurality of objects in the real-world environment.

15. A computer program product for identifying a real-world object from Three-Dimensional (3D) data of the real-world object in a Computer Aided Design (CAD) system, the computer program product executed by a server in communication across a network with one or more clients and comprising:
a non-transitory computer readable medium, the non-transitory computer readable medium comprising program instructions which, when executed by a processor causes the processor to:
obtain in computer memory of the CAD system, 3D data, in a first data storage file format, of a real-world environment comprising a plurality of objects;
flatten a portion of the 3D data of the real-world environment corresponding to a given object of the plurality of objects to produce Two-Dimensional (2D) data of the given object, the given object being unidentified;
compare the produced 2D data of the given object to a subset of a library of existing 2D object data to identify matching 2D object data, the library being held in the computer memory of the CAD system and including 2D object data stored in the computer memory in one or more data storage file formats different from the first data storage file format, and the matching 2D object data corresponding to a respective certain real-world object, the subset of the library determined using a given identified object in the real-world environment;
as a result of the comparing, identify the given object to be of kind to the respective certain real-world object; and
responsive to the identifying, update metadata of the 3D data corresponding to the given object in the computer memory of the CAD system using the matching 2D object data corresponding to the respective certain real-world object.

16. The computer program product of claim 15, wherein the matching 2D object data includes at least one of:
an object type; and an object material.

17. The computer program product of claim 15, wherein the obtained 3D data of the real-world environment is at least one of:
a 3D CAD model;
and a point cloud.

* * * * *